(12) United States Patent
Smirnov et al.

(10) Patent No.: US 8,095,947 B2
(45) Date of Patent: Jan. 10, 2012

(54) MOTOR AND DISK DRIVER HAVING THE SAME

(75) Inventors: Viatcheslav Smirnov, Suwon-si (KR);
Dong-Yeon Shin, Suwon-si (KR);
Nam-Sock Kim, Osan-si (KR)

(73) Assignee: Samsung Electro-Mechanics Co., Ltd.,
Gyunggi-Do (KR)

( * ) Notice: Subject to any disclaimer, the term of this patent is extended or adjusted under 35 U.S.C. 154(b) by 334 days.

(21) Appl. No.: 12/505,307

(22) Filed: Jul. 17, 2009

(65) Prior Publication Data

US 2010/0123975 A1    May 20, 2010

(30) Foreign Application Priority Data

Nov. 14, 2008    (KR) .................... 10-2008-0113627

(51) Int. Cl.
*G11B 17/028*    (2006.01)
(52) U.S. Cl. ........................................ 720/710
(58) Field of Classification Search .................. 720/706,
720/622, 713, 704, 619, 715, 655, 610, 690,
720/624, 652, 707, 604, 702, 696, 712, 703,
720/709, 710
See application file for complete search history.

(56) References Cited

U.S. PATENT DOCUMENTS

| | | | | |
|---|---|---|---|---|
| 7,216,355 B2 * | 5/2007 | Kim et al. | ...................... | 720/706 |
| 7,313,801 B2 * | 12/2007 | Choi et al. | ..................... | 720/709 |
| 7,343,610 B2 * | 3/2008 | Shibata | ......................... | 720/713 |
| 7,478,412 B2 * | 1/2009 | Huh et al. | ...................... | 720/706 |
| 7,802,273 B2 * | 9/2010 | Kim et al. | ...................... | 720/709 |
| 7,900,223 B2 * | 3/2011 | Takaki et al. | ................. | 720/707 |
| 2004/0244024 A1 * | 12/2004 | Horng et al. | .................. | 720/706 |
| 2004/0244025 A1 * | 12/2004 | Horng et al. | .................. | 720/706 |
| 2006/0031866 A1 * | 2/2006 | Kim et al. | ...................... | 720/706 |
| 2007/0199010 A1 * | 8/2007 | Chen | .............................. | 720/706 |
| 2010/0242058 A1 * | 9/2010 | Yoon | .............................. | 720/706 |

FOREIGN PATENT DOCUMENTS

| | | |
|---|---|---|
| KR | 1993-0005502 | 8/1993 |
| KR | 10-0834334 | 6/2008 |

OTHER PUBLICATIONS

Korean Office Action issued in Korean Patent Application No. 10-2008-0113627, mailed May 7, 2010.

* cited by examiner

*Primary Examiner* — Allen Cao
(74) *Attorney, Agent, or Firm* — McDermott Will & Emery LLP

(57) ABSTRACT

A motor and a disk driver having the motor are disclosed. The motor in accordance with an embodiment of the present invention includes: a shaft; a boss, which is coupled to one end of the shaft; a bearing, which supports the other end of the shaft such that the shaft can rotate; a holder, which supports the bearing; a stator, which is coupled to the holder; a rotor, which is coupled to the boss and covers the stator; and a ventilation hole, which is formed on a lower surface of the boss such that air flows toward the stator. The motor in accordance with an embodiment of the present invention can make the flow of air around a disk stable by forming an air circulation structure, allowing air to flow from the inside to the outside of the motor.

12 Claims, 16 Drawing Sheets

MOTOR AND DISK DRIVER HAVING THE SAME

CROSS-REFERENCE TO RELATED APPLICATIONS

This application claims the benefit of Korean Patent Application No. 10-2008-0113627, filed with the Korean Intellectual Property Office on Nov. 14, 2008, the disclosure of which is incorporated herein by reference in its entirety.

BACKGROUND

1. Technical Field

The present invention relates to a motor and a disk driver having the motor.

2. Description of the Related Art

In step with the trends towards smaller size in current electronic devices, the size of storage memory has been increasingly accelerated. Therefore, a disk driver, such as an optical disk, an ODD slim and a half height driving set, of a large memory storage device is now facing a new demand for smaller size and faster motor speed.

As the disk driver rotates faster, the friction with the air around the disk driver (air friction or air resistance) causes a problem. FIG. 1 is a cross-sectional view illustrating a disk driver in accordance with the related art. As illustrated in FIG. 1, when the disk driver rotates a disk mounted on its surface at high speed, the friction between the disk and the air surrounding the disk influences an airflow, making the airflow unstable.

While the disk is affected by the airflow, the disk vibrates up and down, causing a problem of reliability and performance when reading and writing data from and to the disk. Moreover, the unstable motion of the disk may cause the disk driver to consume more electric power for driving the disk.

Furthermore, a spindle motor constituting the disk driver may produce a large amount of heat from a stator due to its rotating motion during the operation. The produced heat influences the airflow around the disk and may worsen the problems described above. Moreover, the heat inside the spindle motor may reduce the efficiency of the spindle motor, causing a problem of increasing the consumption of electric power.

SUMMARY

The present invention provides a motor that has an air circulation structure allowing air to flow from the inside to the outside of the motor.

An aspect of the present invention provides a motor. The motor in accordance with an embodiment of the present invention includes: a shaft; a boss, which is coupled to one end of the shaft; a bearing, which supports the other end of the shaft such that the shaft can rotate; a holder, which supports the bearing; a stator, which is coupled to the holder; a rotor, which is coupled to the boss and covers the stator; and a ventilation hole, which is formed on a lower surface of the boss such that air flows toward the stator.

There are a plurality of ventilation holes, and the plurality of ventilation holes are formed along a circumference of the boss. The ventilation hole is formed to penetrate through the boss vertically and formed on an outer surface of the boss. Moreover, the ventilation hole is tilted from the axis of the shaft.

The rotor can include a cylinder part, which is coupled to an outer surface of the boss, and the boss can be extended outward such that an upper side of the bearing is positioned below the cylinder part.

Another aspect of the present invention provides a disk driver. The disk driver, which drives a disk, in accordance with an embodiment of the present invention includes: a shaft; a boss, which is coupled to one end of the shaft; a bearing, which supports the other end of the shaft such that the shaft can rotate; a holder, which supports the bearing; a stator, which is coupled to the holder; a rotor, which is coupled to the boss and covers the stator; a chucking part, which couples the disk to the rotor such that the disk can be mounted and demounted; and a ventilation hole, which is formed on a lower surface of the boss such that air flows toward the stator.

There are a plurality of ventilation holes, and the plurality of ventilation holes are formed along a circumference of the boss. The ventilation hole is formed to penetrate through the boss vertically and formed on an outer surface of the boss. Moreover, the ventilation hole is tilted from the axis of the shaft.

The rotor can include a cylinder part, which is coupled to an outer surface of the boss, and the boss can be extended outward such that an upper side of the bearing is positioned below the cylinder part.

Additional aspects and advantages of the present invention will be set forth in part in the description which follows, and in part will be obvious from the description, or may be learned by practice of the invention.

DETAILED DESCRIPTION

Figure 1:
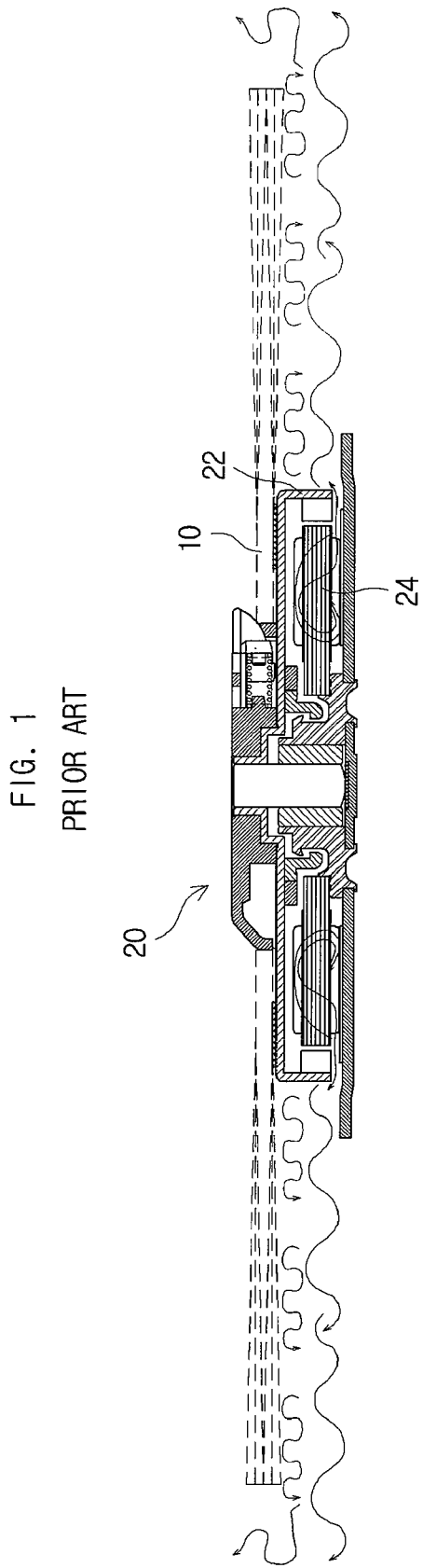
FIG. 1 is a cross-sectional view illustrating a disk driver in accordance with the related art.

The features and advantages of this invention will become apparent through the below drawings and description.

A disk driver according to certain embodiments of the present invention will be described below in more detail with reference to the accompanying drawings. Those components that are the same or are in correspondence are rendered the same reference numeral regardless of the figure number, and redundant descriptions are omitted.

Figure 2:
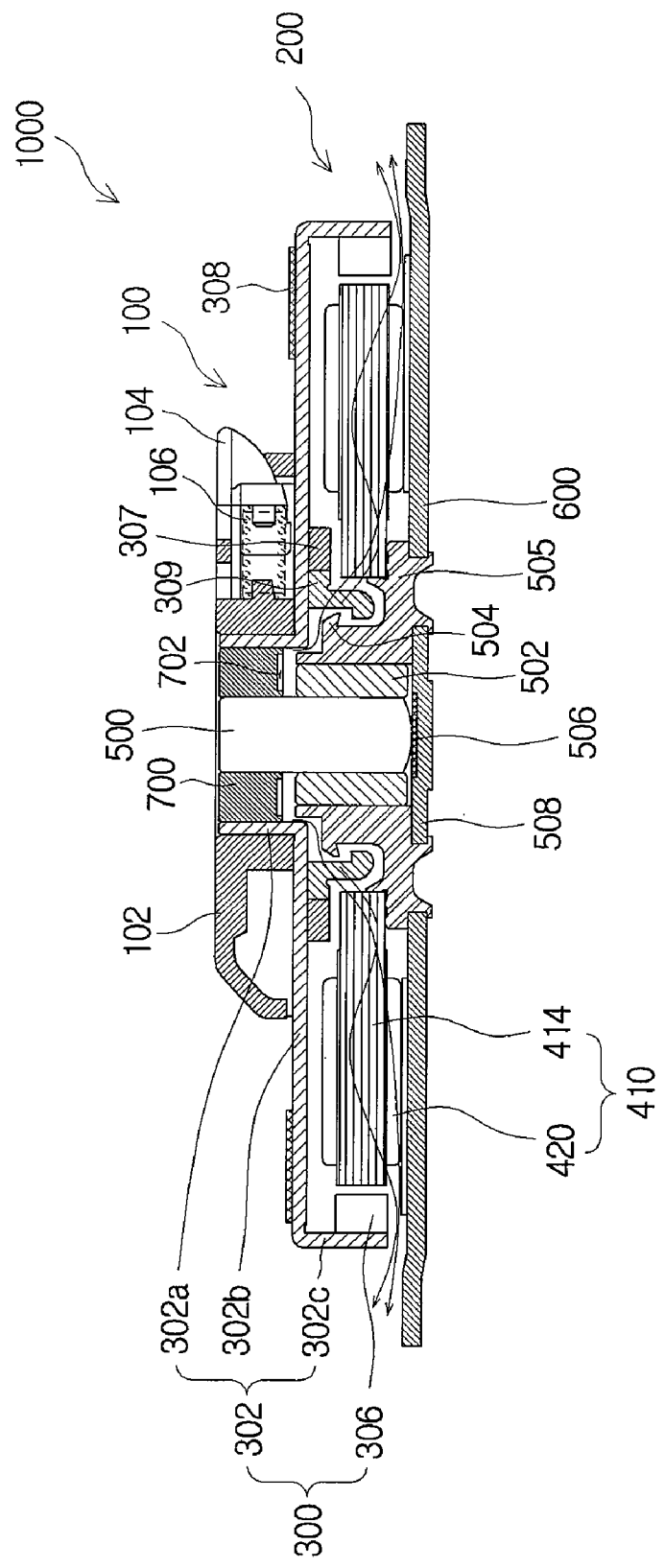
FIG. 2 is a cross-sectional view illustrating a disk driver in accordance with an embodiment of the present invention.
Figure 3:
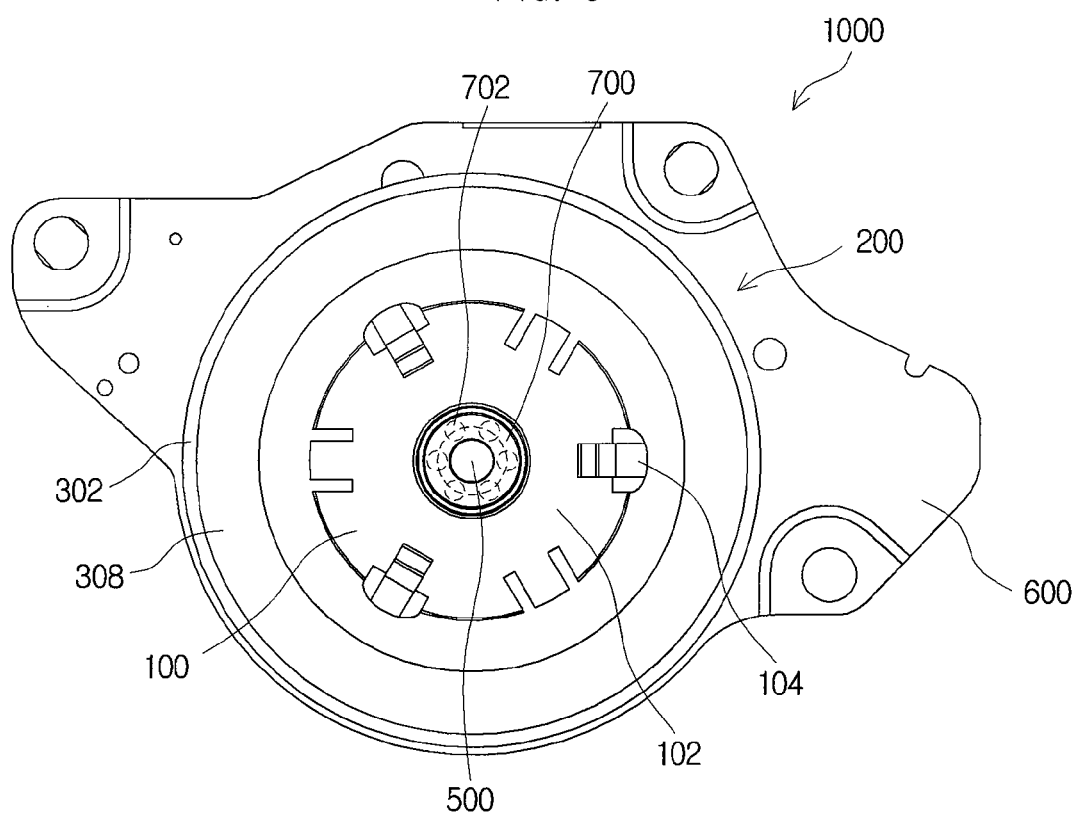
FIG. 3 is a plan view illustrating a disk driver in accordance with an embodiment of the present invention.

FIG. 2 is a cross-sectional view illustrating a disk driver in accordance with an embodiment of the present invention, and FIG. 3 is a plan view illustrating a disk driver in accordance with an embodiment of the present invention. As illustrated in FIGS. 2 and 3, a disk driver driving a disk in accordance with an embodiment of the present invention includes: a shaft; a boss, which is coupled to one end of the shaft; a bearing, which supports the other end of the shaft such that the shaft can rotate; a holder, which supports the bearing; a stator, which is coupled to the holder; a rotor, which is coupled to the boss and covers the stator; a chucking part, which couples the disk to the rotor such that the disk can be mounted and demounted; and a ventilation hole, which is formed on a lower surface of the boss such that air flows toward the stator. According to the disk driver based on an embodiment of the present invention, a spindle motor can be cooled by forming an air circulation structure allowing air to flow from the inside to the outside of the disk driver, and the flow of air around the disk can be stabilized.

A disk driver 1000 can include a chucking part 100 and a spindle motor 200.

The chucking part 100 can couple a disk to the spindle motor 200 such that the disk can be mounted and demounted. The chucking part 100 can include a housing 102, a chuck pin 104 and an elastic body 106. The housing 102 can house the chuck pin 104 and the elastic body 106 and be coupled to a rotor 300. The chuck pin 104 can be positioned in the housing 102 such that the chuck pin 104 is protruded to the outside of the housing 102. The elastic body 106 can elastically support the chuck pin 104.

As the chucking part 100 is inserted in an inner surface of the disk 10, the chuck pin 104 can be moved backward and forward. When the disk is mounted on the rotor 300, the chucking part 100 can couple the disk to the spindle motor 200 such that the disk can be mounted and demounted, while the chuck pin 104 presses the inner surface of the disk.

A bearing 502 can support a shaft 500 such that the shaft can rotate. The bearing 502 can be an oil-impregnated bearing, in which a lubricant is impregnated. There can be a gap between the shaft 500 and the oil-impregnated bearing such that the lubricant leaking from the oil-impregnated bearing 502 can be positioned.

A holder 505 can support the bearing 502. The holder 505 can surround an outer circumference of the bearing 502 to fix the bearing 502 to a bearing plate 600. A stator 410 can be coupled to the outer circumference of the holder 505.

The stator 410 can include a stator core 414 with teeth and a ring shaped body and a coil 420 being wound on the teeth. The teeth can have a form extended toward the outside of the ring-shaped body.

The ring-shaped body can be fixed to the holder 505 by coupling an inner circumference of the ring-shaped body to the outer circumference of the holder 505. When electricity is supplied to the coil 420, the rotor 300 can be rotated due to an electromagnetic effect caused by the stator 410 facing a driving magnet 306.

A thrust plate 508 can be coupled to a lower side of the holder 505 such that a lower end of the shaft 500 can be supported. A washer 506 is coupled to an upper surface of the thrust plate 508 such that the shaft 500 can be rotated smoothly.

A hasp 504 can be formed on an upper side of the holder 505 such that a stopper 309 formed on a lower side of the rotor 300 can be locked. An attracting magnet 307 can be coupled to the lower side of the rotor 300 to contribute to rotate the rotor 300 in a stable motion by attracting the stator 410.

The rotor 300 can include a rotor case 302, the driving magnet 306 and a friction pad 308. The rotor case 302 can include a cylinder part 302a, a covering part 302b and an extending part 302c.

The cylinder part 302a can be shaped like a cylinder protruded upward in the middle of the rotor case 302 and can be formed by bending a center portion of the rotor case 302. A boss 700 can be positioned inside the cylinder part 302a and coupled to the shaft 500. Moreover, the cylinder part 302a can be inserted in the middle of the chucking part 100 and fix the chucking part 100 to the spindle motor 200.

The covering part 302b can be extended radially from a lower end of the cylinder part 302a to cover the stator 400. The ring-shaped friction pad 308 can be coupled to an upper surface of the covering part 302b such that a lower surface of the disk being mounted on the chucking part 100 can be supported. The extending part 302c is extended in a shape of cylinder downward from the edge of the covering part 302b, and the driving magnet 306 can be coupled to an inner circumference of the extending part 302c such that the driving magnet 306 faces an outer circumference of the stator 410.

The boss 700 can be coupled to an upper side of the shaft 500. The cylinder part 302a of the rotor can be coupled to an outer circumference of the boss 700. The boss 700 can be extended outward such that an upper side of the bearing 502 is positioned below the cylinder part 302a. For this, the diameter of the boss 700 can be greater than that of the bearing 502.

Since the bearing 502 is positioned below the cylinder part 302a, the bearing can be extended lengthwise, and thus the length of the bearing 502 supporting the shaft 500 can be further extended. This can solve the problem of insufficient length of the bearing 502 for supporting the shaft 500 due to the spindle motor 200 that becomes thinner.

Figure 4:
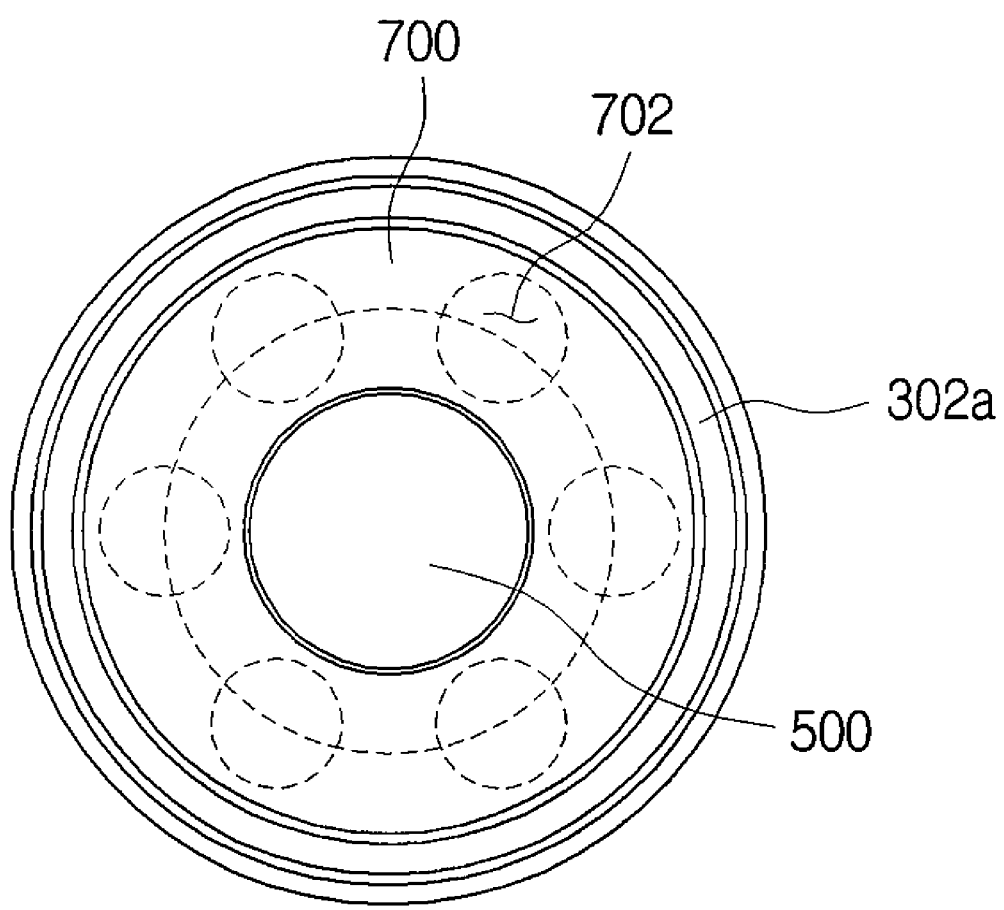
FIG. 4 is a plan view illustrating a boss of a disk driver in accordance with an embodiment of the present invention.
Figure 5:
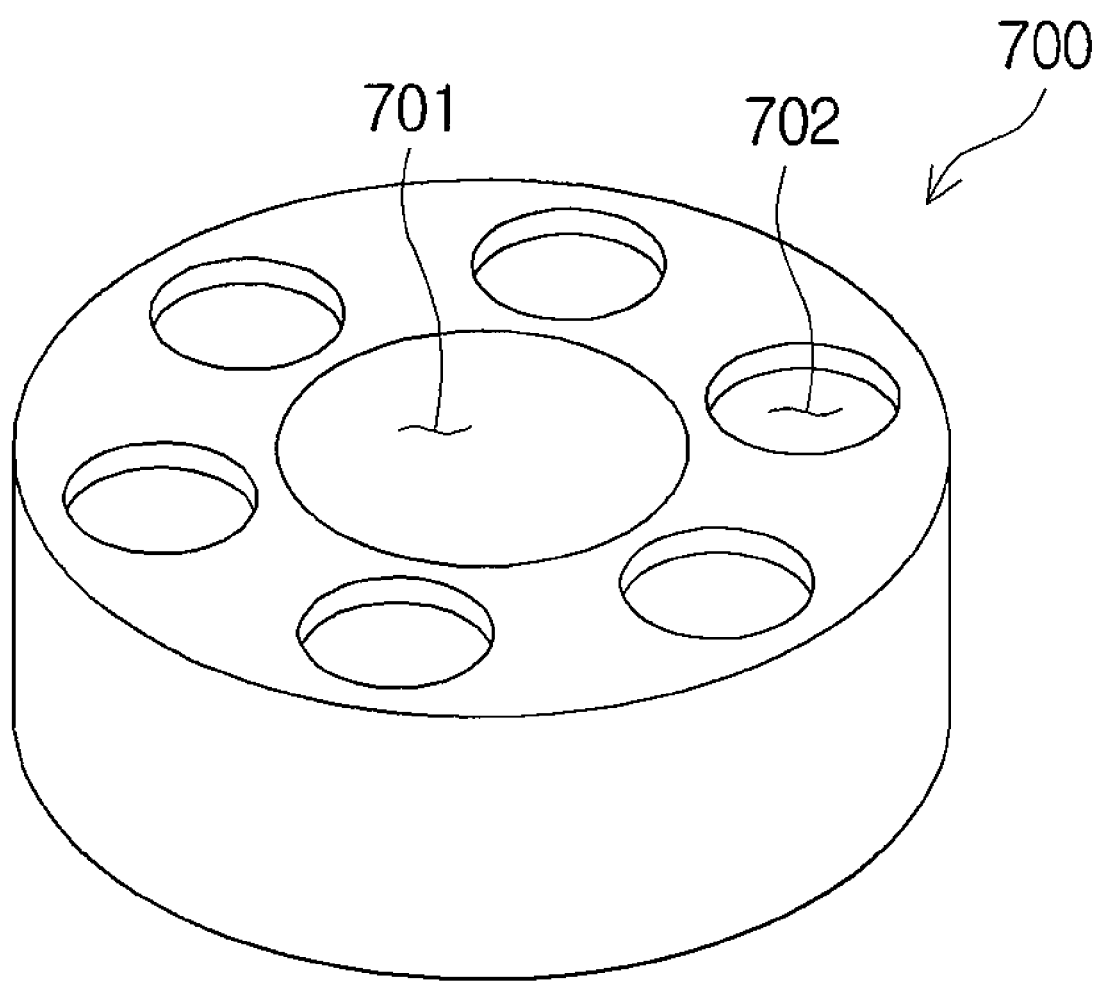
FIG. 5 is a perspective view illustrating a boss of a disk driver in accordance with an embodiment of the present invention.

FIG. 4 is a plan view illustrating the boss 700 of the disk driver 1000 in accordance with an embodiment of the present invention. FIG. 5 is a perspective view illustrating the boss 700 of the disk driver 1000 in accordance with an embodiment of the present invention. As illustrated in FIGS. 4 and 5, a ventilation hole 702 can be formed on a lower surface of the boss 700 such that air flows toward the stator 410. The ventilation hole 702 can be in the shape of a circle that is grooved from the lower surface to the inside of the boss 700 and can be disposed along the circumference of the boss 700.

As illustrated in FIG. 1, when the disk driver 1000 rotates, the ventilation hole 702 can generate an airflow toward the lower side of the boss 700. The airflow generated by the ventilation hole 702 flows toward the stator 410 while passing through a space between the bearing 502 and the rotor 300.

While passing through the stator 410, the airflow absorbs heat produced by the stator 410 and goes outside the spindle motor 200 through a space between the rotor 300 and the bearing plate 600. As a result, the ventilation hole 702 can lower the operating temperature of the spindle motor 200 by generating the airflow cooling the stator 410. When the operating temperature of the disk driver 1000 is lowered, the consumption of electric power by the disk driver 1000 can be reduced, thereby improving the efficiency.

Meanwhile, the airflow escaped from the space between the rotor 300 and the bearing plate 600 can circulate around an outer circumference of the disk and over an upper side of the disk driver 1000. As a result, the air surrounding the disk circulates up and down, making the airflow around the disk stable.

When the flow of air around the disk becomes stable, unnecessary friction between the disk and the air surrounding the disk can be reduced, and thus the power consumption by the disk driver 1000 can be reduced. Additionally, the up and down motion (vibration) of the disk caused by an unstable airflow around the disk can be prevented.

Figure 6:
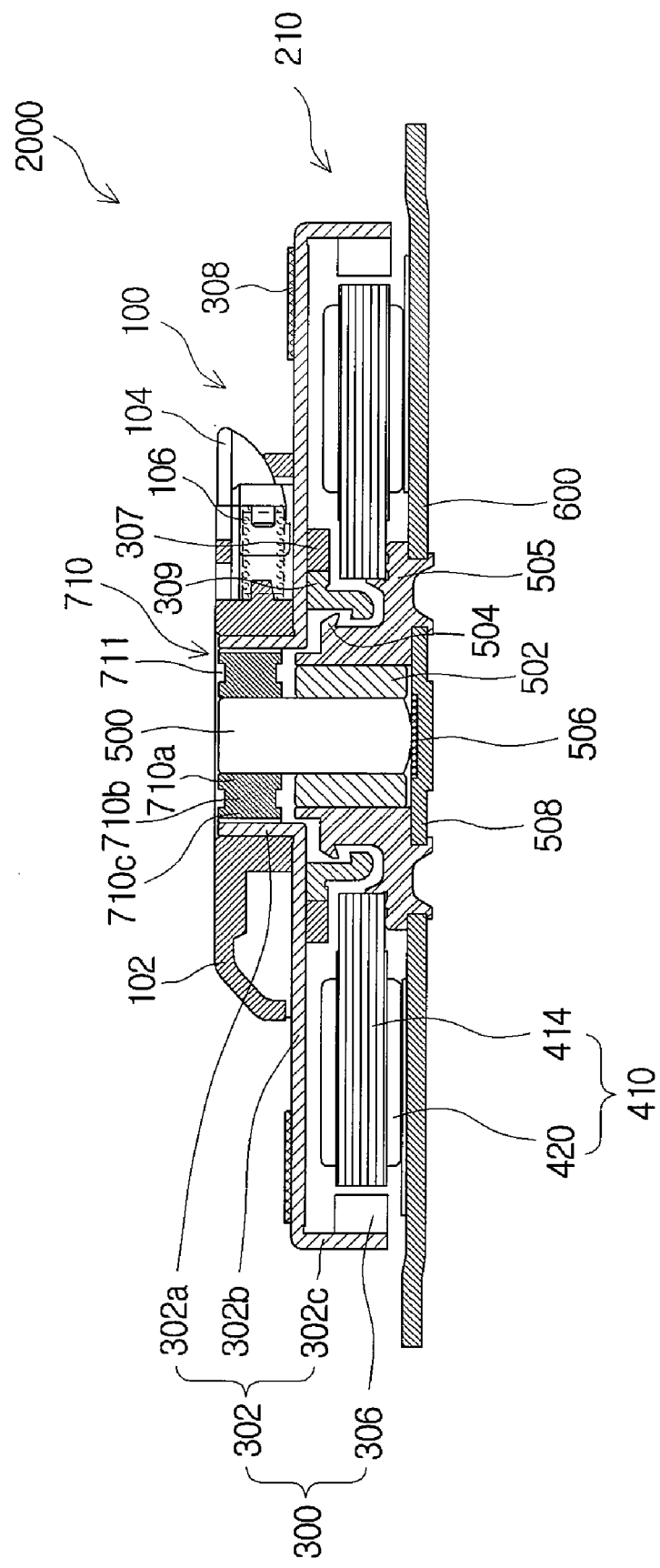
FIG. 6 is a cross-sectional view illustrating a disk driver in accordance with another embodiment of the present invention.
Figure 7:
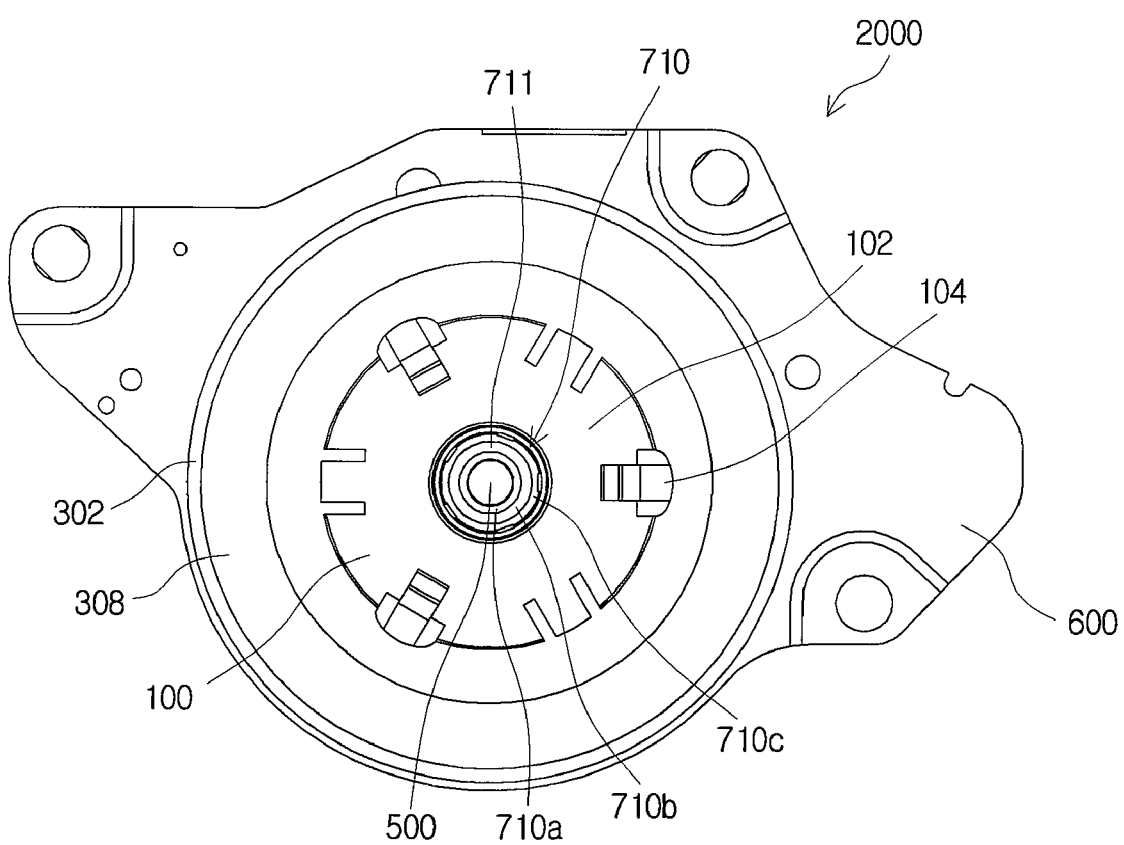
FIG. 7 is a plan view illustrating a disk driver in accordance with another embodiment of the present invention.

FIG. 6 is a cross-sectional view illustrating a disk driver 2000 in accordance with another embodiment of the present invention, and FIG. 7 is a plan view illustrating the disk driver 2000 in accordance with another embodiment of the present invention. As illustrated in FIGS. 6 and 7, the disk driver 2000 in accordance with another embodiment of the present invention includes a ventilation hole 712, which penetrates a boss 710 vertically, and can form an air circulation structure that cools a spindle motor 210 and stabilizes the flow of air around a disk.

Since the disk driver 2000 in accordance with another embodiment of the present invention can have substantially the same components of the disk driver 1000 in accordance with the previously described embodiment, except for the boss 710, a further description will be omitted.

Figure 8:
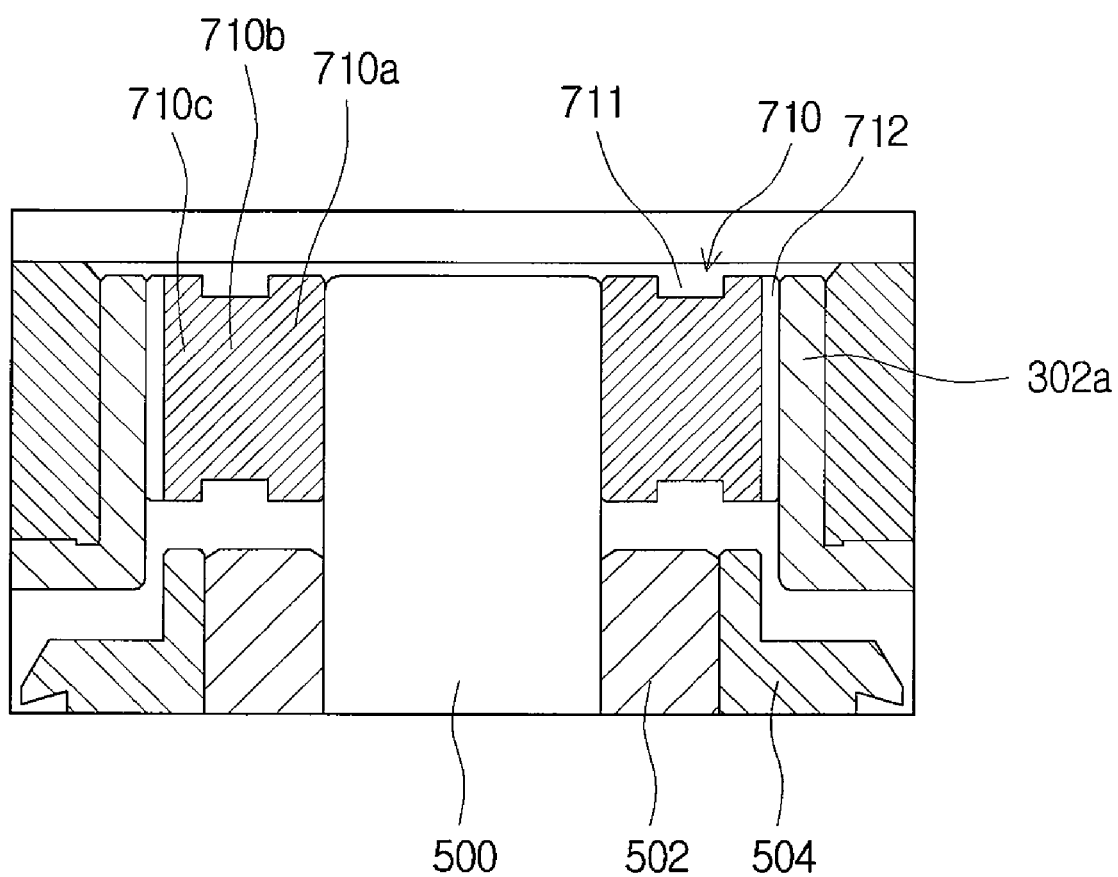
FIG. 8 is a cross-sectional view illustrating a portion of a disk driver in accordance with another embodiment of the present invention.
Figure 9:
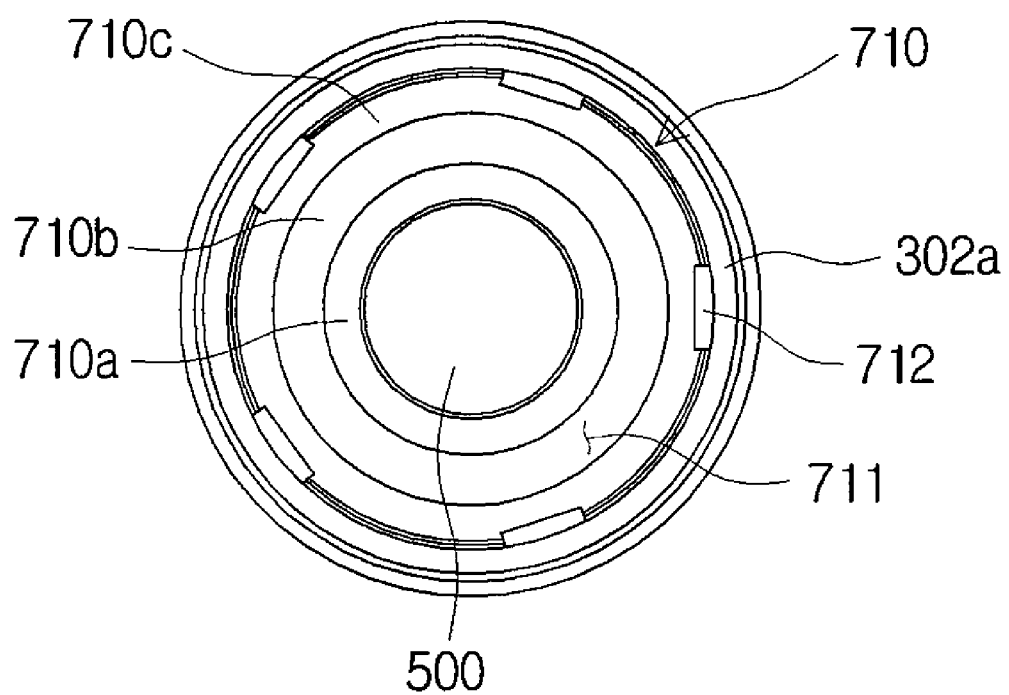
FIG. 9 is a plan view illustrating a boss of a disk driver in accordance with another embodiment of the present invention.
Figure 10:
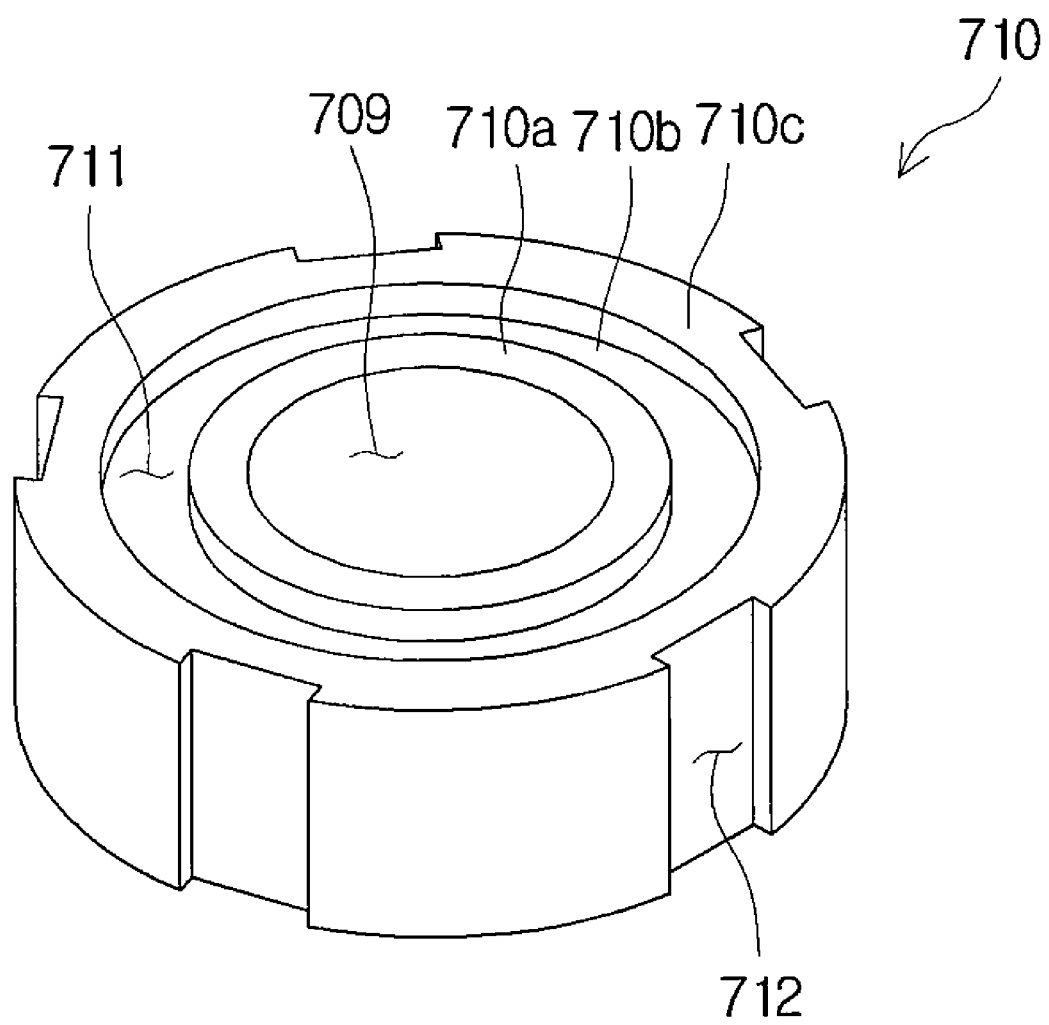
FIG. 10 is a perspective view illustrating a boss of a disk driver in accordance with another embodiment of the present invention.

FIG. 8 is a cross-sectional view illustrating a portion of the disk driver 2000 in accordance with another embodiment of the present invention, and FIG. 9 is a plan view illustrating the boss 710 of the disk driver 2000 in accordance with another embodiment of the present invention. FIG. 10 is a perspective view illustrating the boss 710 of the disk driver 2000 in accordance with another embodiment of the present invention.

As illustrated in FIGS. 8 to 10, the boss 710 can include an inner facing part 710a, which is coupled to the shaft 500, a connecting part 710b, which is extended outward from the inner facing part 710a, and an outer facing part 710c, which is coupled to the cylinder part 302a of the rotor 300 by being coupled to an outer side of the connecting part 710b. A hollow part 709, to which the shaft 500 is inserted, can be formed in the middle of the boss 710.

Especially to be coupled to the shaft 500, the inner facing part 710a can be formed relatively thicker than the connecting part 710b. The connecting part 710b can increase an outer circumference of the boss 710 such that the upper side of the bearing 502 is positioned below the cylinder part 302a.

A ring-shaped groove 711 can be formed on an upper side and a lower side of the connecting part 710b. The outer facing part 710c can be shaped like a cylinder extending vertically from two circular ends of the connecting part 710b, and an outer circumference of the outer facing part 710c is coupled to an inner circumference of the cylinder part 302a.

The ventilation hole 712 can be formed on the outer circumference of the outer facing part 710c to extend vertically.

There can be a plurality of ventilation holes 712 formed on the outer circumference of the outer facing part 710c along the circumference of the boss 710.

Figure 11:
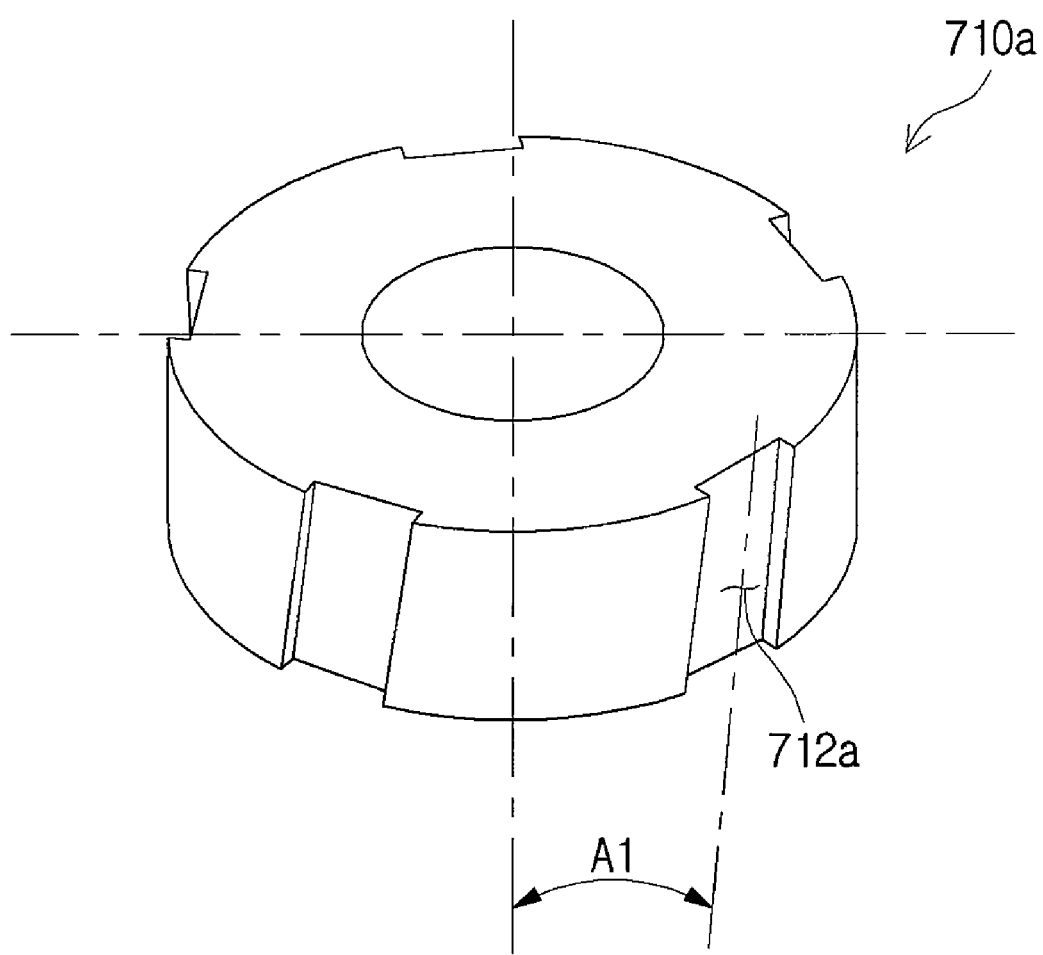
FIG. 11 is a perspective view illustrating a modification of a boss of a disk driver in accordance with another embodiment of the present invention.
Figure 12:
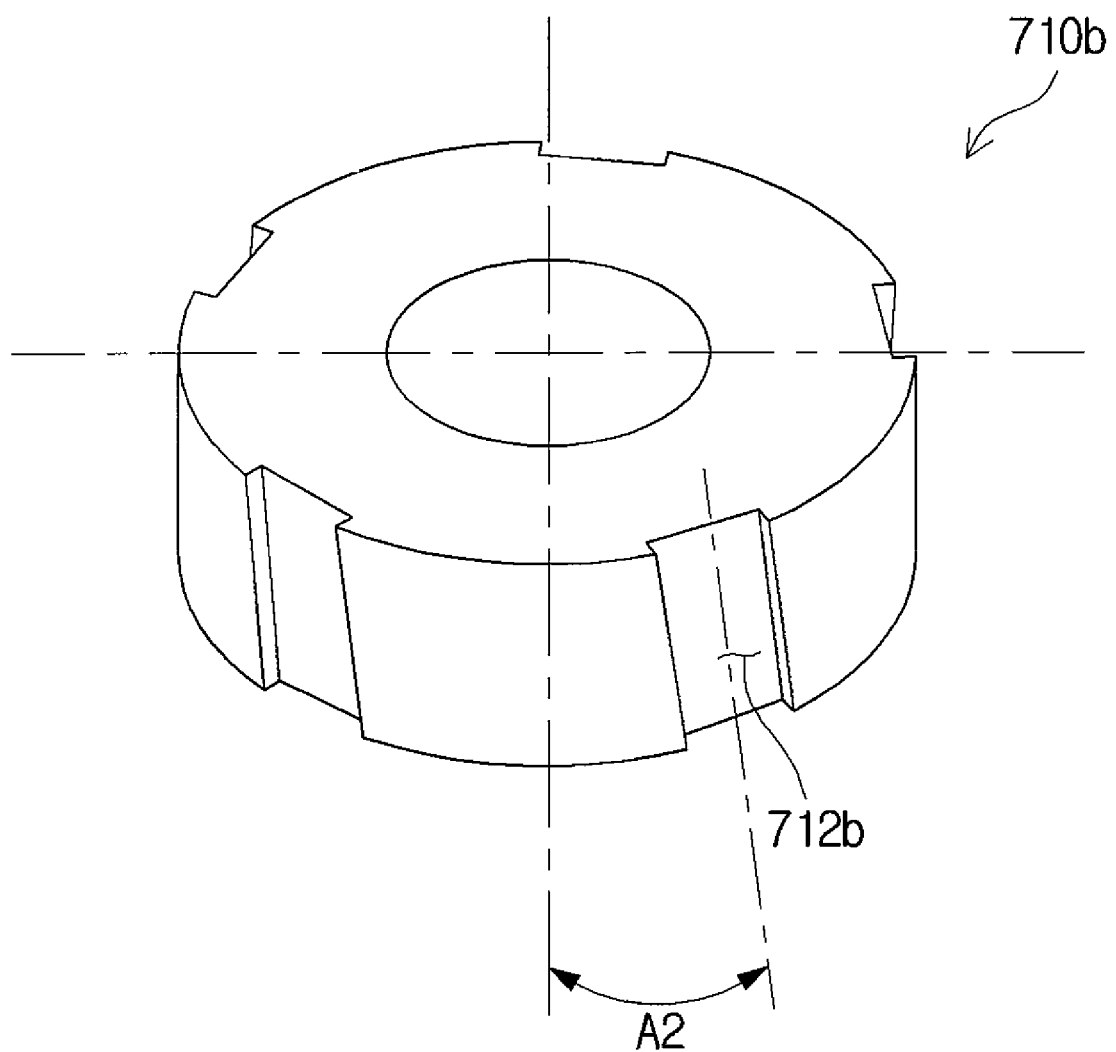
FIG. 12 is a perspective view illustrating another modification of a boss of a disk driver in accordance with another embodiment of the present invention.

FIG. 11 is a perspective view illustrating a modification of the boss 710a of the disk driver 2000 in accordance with another embodiment of the present invention, and FIG. 12 is a perspective view illustrating another modification of the boss 710b of the disk driver 2000 in accordance with another embodiment of the present invention. FIGS. 11 and 12 show different examples of the ventilation holes 712a and 712b. As illustrated in FIGS. 11 and 12, the ventilation holes 712a and 712b can be tilted to one side from the axis of the shaft 500.

The tilted ventilation holes 712a and 712b can generate different forms of airflow, depending on the rotating direction of the disk driver 2000. The tilted ventilation holes 712a and 712b can be also deformed selectively, depending on the rotating direction of the disk driver 2000.

Figure 13:
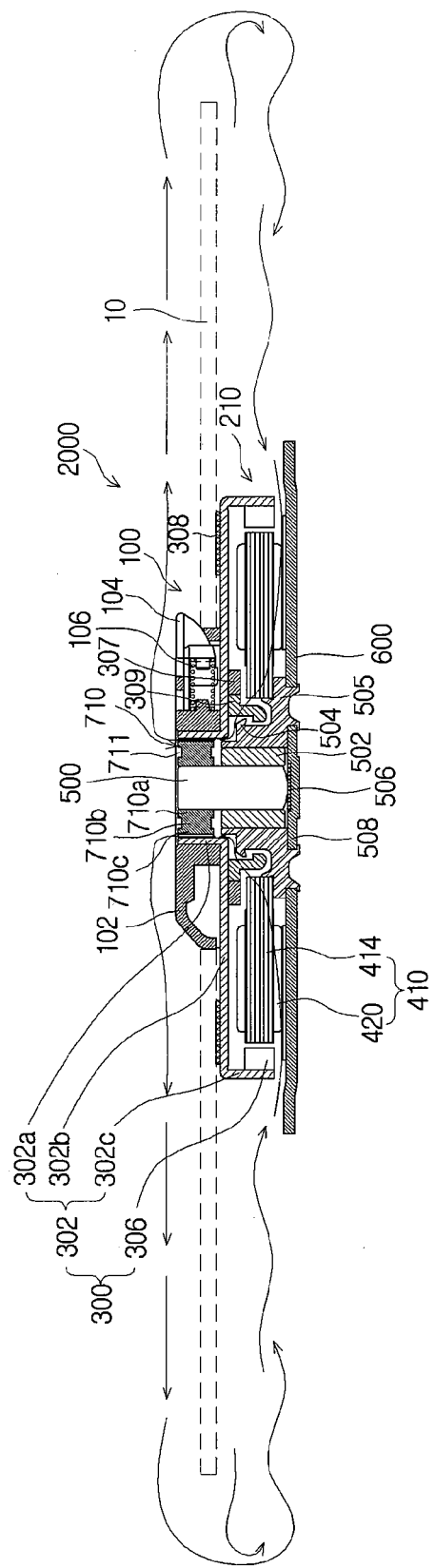
FIG. 13 is a cross-sectional view illustrating the flow of air around a disk driver in accordance with another embodiment of the present invention.

FIG. 13 is a cross-sectional view illustrating the flow of air around the disk driver 2000 in accordance with another embodiment of the present invention. As illustrated in FIG. 13, when the disk driver 2000 rotates, an airflow can be generated by the ventilation hole 712. Since the ventilation hole 712 in accordance with the present embodiment is shaped like a groove penetrating vertically through the boss 710, the air inside the spindle motor 210 can be circulated from the inside to the outside of the spindle motor 210.

The airflow generated by the ventilation hole 712 can flow to the outside of the spindle motor 210 through an upper side of the ventilation hole 712 and flow to the edge of the disk 10 along an upper surface of the disk 10. Likewise, another airflow from a lower surface of the disk 10 can absorb heat from the stator 410 and flow upward to a lower side of the ventilation hole 712.

Meanwhile, the airflow arrived at the edge of the disk 10 can be put toward a lower side of the disk 10 by another airflow being put through the space between the rotor 300 and the bearing plate 600. As a result, the flow of air around the disk 10 can circulate around the disk 10 through the spindle motor 210.

Therefore, the occurrence of vibration due to an unstable airflow can be prevented by having an air circulation structure making the airflow stable.

Furthermore, since air flows through the stator 410 inside the spindle motor 210, the heat inside the spindle motor 210 can be discharged to the outside of the spindle motor 210, forming a cooling structure in the spindle motor 210.

Figure 14:
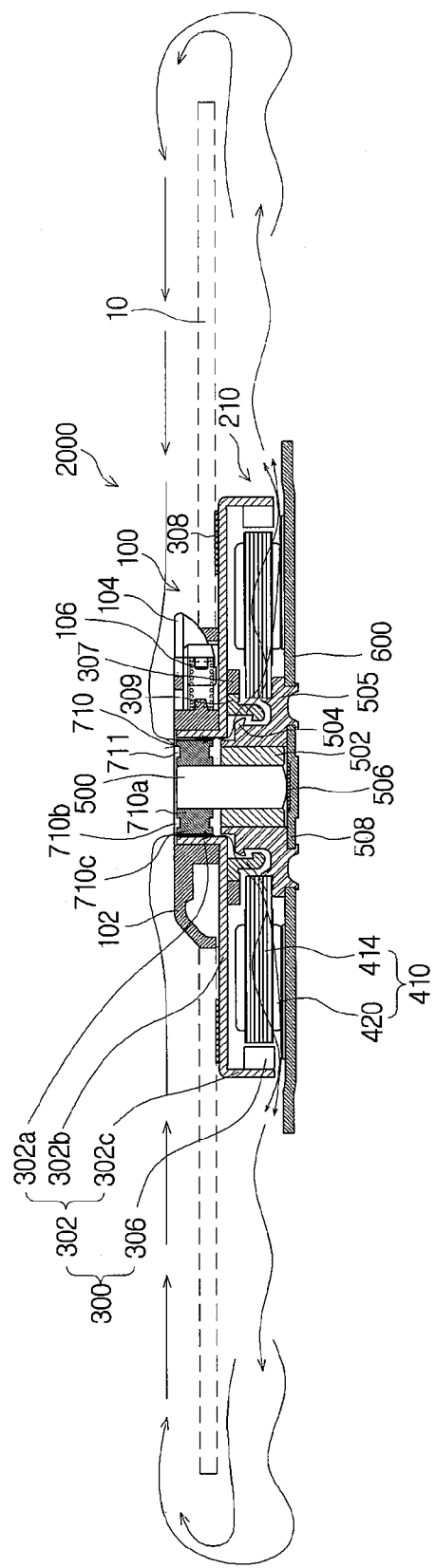
FIG. 14 is a cross-sectional view illustrating the flow of air around a disk driver in accordance with another embodiment of the present invention.

FIG. 14 is a cross-sectional view illustrating the flow of air around the disk driver 2000 in accordance with another embodiment of the present invention. FIG. 14 illustrates a reverse direction of airflow in comparison with FIG. 13. The direction of airflow circulating through the inside and outside of the disk driver 2000 can be modified in accordance with the rotating direction of the disk driver 2000. In this case, the route of airflow can be the same as that of FIG. 13.

Figure 15:
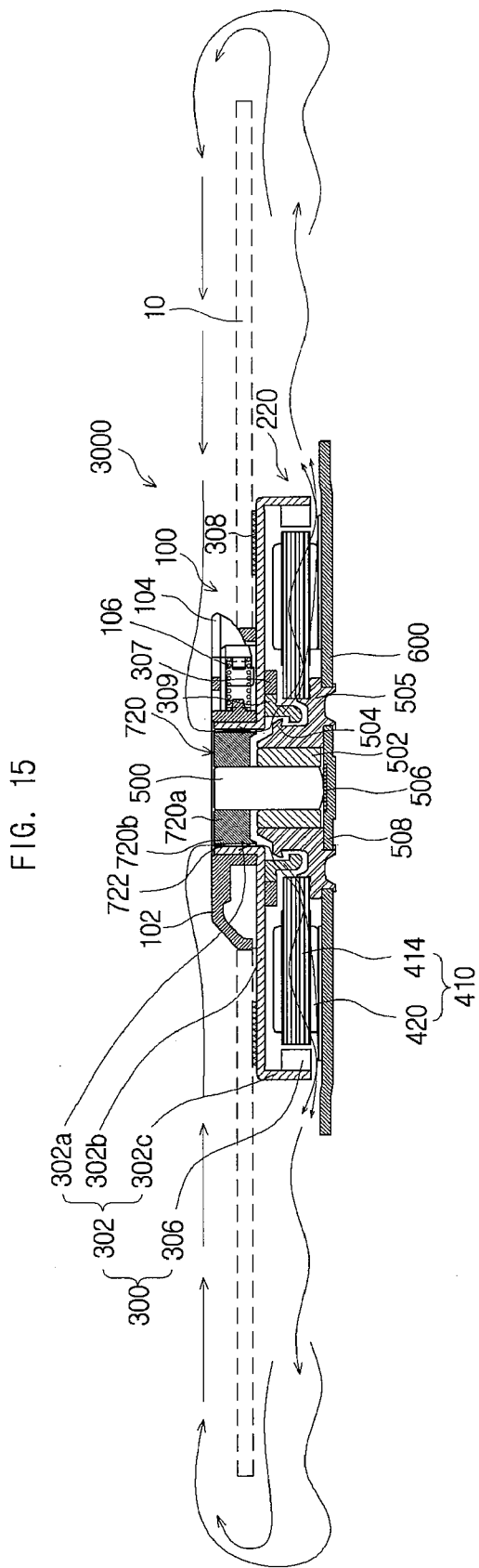
FIG. 15 is a cross-sectional view illustrating the flow of air around a disk driver in accordance with yet another embodiment of the present invention.
Figure 16:
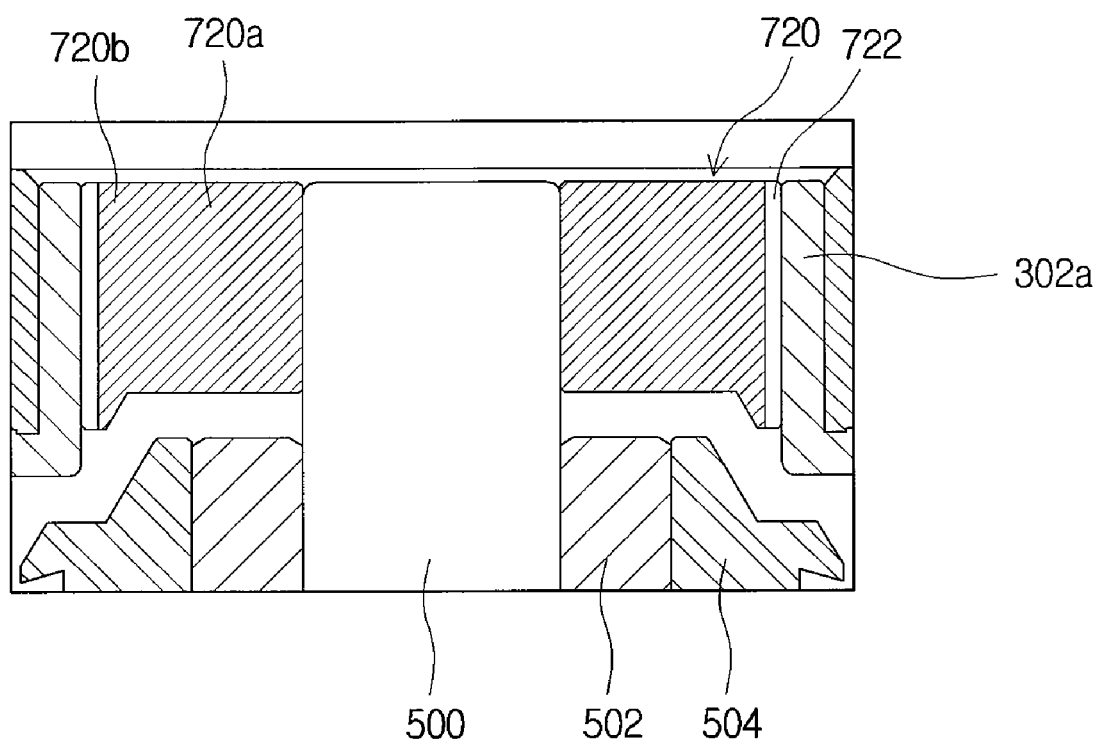
FIG. 16 is a cross-sectional view illustrating a portion of a disk driver in accordance with yet another embodiment of the present invention.

FIG. 15 is a cross-sectional view illustrating the flow of air around a disk driver 3000 in accordance with yet another embodiment of the present invention, and FIG. 16 is a cross-sectional view illustrating a portion of the disk driver 3000 in accordance with yet another embodiment of the present invention.

Since the disk driver 3000 in accordance with yet another embodiment of the present invention can have substantially the same components of the disk driver 1000 in accordance with an embodiment of the present invention described earlier, except for a boss 720, a further description will be omitted.

As illustrated in FIGS. 15 and 16, the boss 720 in accordance with yet another embodiment of the present invention presents another form. The boss 720 in accordance with yet another embodiment of the present invention can include a body 720a, which is coupled to the shaft 500, and a ramp 720b, which is coupled to an outer side of the body 720a.

An upper and lower surfaces of the body 720a is formed flat, and the body 720a can have the form of a disk shaped like a ring. The ramp 720b is formed on an outer circumference of the body 720a, and a ventilation hole 722 can be formed on the outer circumference of the body 720a. A lower side of the ramp 720b is extended downward from a lower side of the body 720a, and the lower side of the ramp 720b can be tilted toward the center of the boss 720.

Here, the outer circumference of the body 720a can be greater than that of the bearing 502, and the bearing 502 can be extended lengthwise toward a lower side of the boss 720. Moreover, the holder 505 adjacent to the upper side of the bearing 502 can be formed in accordance with the shape of the ramp 720b and thus tilted facing the ramp 720b. Therefore, the flow of air through the ventilation hole 722 can be performed more smoothly.

The flow of air can circulate from the center of the disk 10 to the edge through the spindle motor 220, as illustrated in FIG. 15, and the direction of airflow can be the same as or opposite from that of FIG. 14.

While the spirit of the invention has been described in detail with reference to particular embodiments, the embodiments are for illustrative purposes only and shall not limit the invention. It is to be appreciated that those skilled in the art can change or modify the embodiments without departing from the scope and spirit of the invention. As such, many embodiments other than those set forth above can be found in the appended claims.

What is claimed is:

1. A motor of a disk drive comprising:
   a shaft;
   a boss coupled to one end of the shaft;
   a bearing configured to support the other end of the shaft such that the shaft can rotate;
   a holder configured to support the bearing;
   a stator coupled to the holder;
   a rotor coupled to the boss and configured to cover the stator; and
   a ventilation hole formed on a lower surface of the boss such that air flows toward the stator.

2. The motor of claim 1, wherein there are a plurality of ventilation holes, and the plurality of ventilation holes are formed along a circumference of the boss.

3. The motor of claim 1, wherein the ventilation hole is formed to penetrate through the boss vertically.

4. The motor of claim 3, wherein the ventilation hole is formed on an outer surface of the boss.

5. The motor of claim 3, wherein the ventilation hole is tilted from the axis of the shaft.

6. The motor of claim 1, wherein the rotor comprises a cylinder part being coupled to an outer surface of the boss, and the boss is extended outward such that an upper side of the bearing is positioned below the cylinder part.

7. A disk driver configured to drive a disk, the disk driver comprising:
   a shaft;
   a boss coupled to one end of the shaft;
   a bearing configured to support the other end of the shaft such that the shaft can rotate;
   a holder configured to support the bearing;
   a stator coupled to the holder; a rotor coupled to the boss and configured to cover the stator;
   a chucking part configured to couple the disk to the rotor such that the disk can be mounted and demounted; and
   a ventilation hole formed on a lower surface of the boss such that air flows toward the stator.

8. The disk driver of claim 7, wherein there are a plurality of ventilation holes, and the plurality of ventilation holes are formed along a circumference of the boss.

9. The disk driver of claim 7, wherein the ventilation hole is formed to penetrate through the boss vertically.

10. The disk driver of claim 9, wherein the ventilation hole is formed on an outer surface of the boss.

11. The disk driver of claim 9, wherein the ventilation hole is tilted from the axis of the shaft.

12. The disk driver of claim 7, wherein the rotor comprises a cylinder part being coupled to an outer surface of the boss, and the boss is extended outward such that an upper side of the bearing is positioned below the cylinder part.

* * * * *